April 7, 1931.                R. KEPICH                1,799,909
                             TOBACCO PIPE
                          Filed April 19, 1929
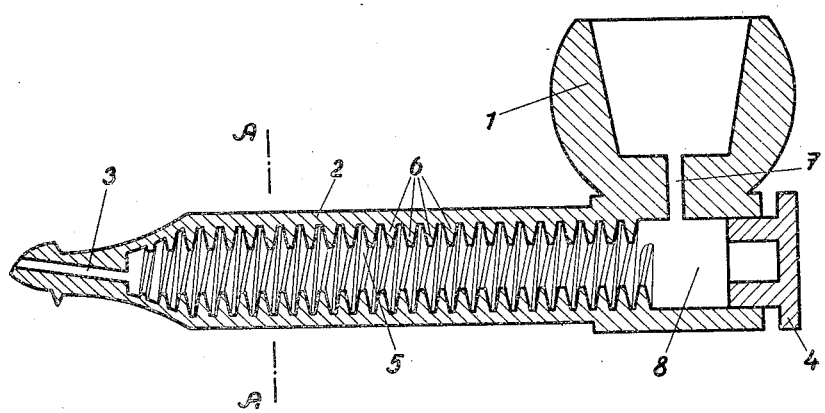
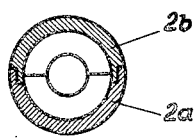

Patented Apr. 7, 1931

1,799,909

UNITED STATES PATENT OFFICE

ROBERT KEPICH, OF VIENNA, AUSTRIA

TOBACCO PIPE

Application filed April 19, 1929, Serial No. 356,322, and in Germany April 27, 1928.

This invention relates to a tobacco pipe, the smoke tube of which is formed with a condensation surface of large area, by providing its internal wall with a helical thread after the manner of the interior of a nut and further this invention relates to the particular mode of arranging the said condensation surface with respect to the pipe bowl and its connection with the latter.

In the accompanying drawing, Figure 1 shows a pipe according to the invention in longitudinal section, and Figure 2 is a section on line A—A of Fig. 1. Referring to the said drawing, the pipe bowl 1 and the tubular stem 2 together with the mouthpiece 3 are made in one piece. At the bowl end of the stem 2 the latter is closed by a detachable stopper 4. The numeral 5 denotes the interior of the tubular stem 2. The entire surface of the interior of this stem 2, or optionally only a portion of same, is made to constitute a condensation surface of large area, by providing it with a threaded helical winding of considerable depth, after the manner of the interior of a threaded nut. The portions 6 therefore correspond to the spaces between the convolutions of a screw fitting into this nut, they extend into the hollow space 5 and form a row of baffle plates, stretching in a helical line from one end of the space 5 to the other.

This large condensation surface chamber can be produced by inserting a screw of corresponding shape into the mould of the pipe which is to be made, such screw, for example, being of iron, and having either one or more turns. The material of which the pipe is to be made is cast or pressed in the mould thus prepared. A suitable material for the pipe would be "bakelite". After the "bakelite" has been pressed in and thoroughly hardened, the screw is screwed out, this being easily possible as the pipe has an opening in the direction of the long axis of the pipe stem.

The condensation space can, however, be formed by pressing a plastic mass into two half-moulds and suitably connecting the two moulded-halves together. The lower half 2a (Fig. 2) will be subjected to the impression of half the thickness of a screw of appropriate length, shape and pitch, and after the screw has served as a pattern in this fashion, it is removed from the plastic mass. The other half of the screw will then be used in like manner for moulding into the proper shape the interior of the upper piece 2b which covers the piece 2a. The pattern-serving screw can be of one, two or multiple pitches, a 3-pitch screw being perhaps preferable. The two parts 2a and 2b are united as shown, for example, in Fig. 2. For fastening together, it is recommended that the meeting edges of the two parts be painted with liquid artificial resin which can be hardened by heating in the usual manner.

In both cases, there is produced a channel having an inner surface formed like the interior of a threaded nut. The grooves between the ridges 6 correspond to the threads of the screw used in shaping them, and these ridges themselves correspond to the spaces between the threads of this screw, extending like a row of baffle plates from one end of the condensation tube to the other.

A further object of the present invention is the particular arrangement of the hollow space 5 of the stem 2 with respect to the pipe bowl 1. Particularly the channel 7 establishing communication between the hollow space 5 of the stem and the tobacco space of the pipe bowl 1 is not in alignment with the axis of the hollow space 5, because this would not sufficiently obstruct the passage of air from the mouthpiece 3 to the tobacco. Therefore according to my invention the communication channel 7 is disposed at angle, for instance a right angle, with respect to the threaded channel 5 and the axis of the communication channel is disposed underneath the pipe bowl. Preferably the threaded channel is arranged with respect to the pipe bowl in such a manner, that it terminates in an air chamber 8 from which the channel 7 branches off into the pipe bowl.

Whilst the tobacco smoke is drawn through the passage 5 prepared as stated, it strikes against the individual windings of the baffle plates and sets up condensation. Furthermore the smoke assumes a whirling motion, which at the same time promotes the deposit of condensation particles to an extraordinary degree and influences formably the cooling of the smoke. A further advantageous result of using the invention as described is that it acts as a preventive against air entering through the mouthpiece and flowing towards the bowl, owing to the whirling of the air which is produced. Were this not so, an undesirable heating of the smoke would occur, as during pauses, or when no air is being drawn through the pipe in the usual way air finds its way to the bowl in the direction just mentioned, which promotes combustion and consequently develops heat. This undesirable entrance of air is limited by the use of the new condensation device, and as above described can be still more reduced by arranging the channel 7 at an angle to the threaded channel 5 as well as by providing the air chamber 8 between the channels 5 and 7. The large condensation surface as described effects thus a cleaning of the smoke from condensation matter and promotes the cooling of the same without in any way checking the flow of the smoke vapours through the pipe.

I am aware that it is not novel to provide the tubular stem of tobacco pipes with a number of circumferential serrations formed by a screw thread. But in my invention I make use of this known arrangement by making the channel 7 pass into the stem at an angle of for instance 90°. By this the smoke is positively caused to make a sharp turn before entering the stem. Thereby a whirling motion is started in the smoke which motion is enhanced by the screw threaded form of the inner surface of the pipe stem. By combining the two elements namely the pipe stem with a screw threaded inner surface and the channel 7 in the above described manner I impart the smoke a whirling motion of far greater intensity than could be attained by only making use of one of the cited elements.

I claim—

1. A tobacco pipe comprising the combination of a pipe stem the inner surface of which is provided with a screw thread after the manner of the interior of a threaded nut, the axis of the said pipe stem passing under the bottom of the pipe bowl, and a channel establishing communication between the pipe bowl and the threaded interior of the pipe stem, the said channel being disposed at an angle with respect to the axis of the said threaded interior.

2. A tobacco pipe comprising the combination of a pipe stem the inner surface of which is provided with a screw thread after the manner of the interior of a threaded nut, the axis of the said pipe stem passing under the bottom of the pipe bowl and a channel establishing communication between the pipe bowl and the threaded interior and of an air chamber interposed between the said channel and the said threaded interior.

In witness whereof I hereunto affix my signature.

ROBERT KEPICH.